United States Patent
Ganapathy et al.

(10) Patent No.: US 6,988,184 B2
(45) Date of Patent: Jan. 17, 2006

(54) DYADIC DSP INSTRUCTION PREDECODE SIGNAL SELECTIVE MULTIPLEXING DATA FROM INPUT BUSES TO FIRST AND SECOND PLURALITY OF FUNCTIONAL BLOCKS TO EXECUTE MAIN AND SUB OPERATIONS

(75) Inventors: Kumar Ganapathy, Mountain View, CA (US); Ruban Kanapathipillai, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 10/211,387

(22) Filed: Aug. 2, 2002

(65) Prior Publication Data

US 2003/0018881 A1 Jan. 23, 2003

Related U.S. Application Data

(62) Division of application No. 09/494,608, filed on Jan. 31, 2000, now Pat. No. 6,446,195.

(51) Int. Cl.
*G06F 9/302* (2006.01)

(52) U.S. Cl. .................... 712/213; 708/501; 708/523; 712/221

(58) Field of Classification Search ............... 708/501, 708/523; 712/208, 221, 213
See application file for complete search history.

(56) References Cited

U.S. PATENT DOCUMENTS

| | | | |
|---|---|---|---|
| 4,969,118 A | 11/1990 | Montoye et al. | 708/501 |
| 5,163,139 A | 11/1992 | Haigh et al. | 712/206 |
| 5,204,828 A | 4/1993 | Kohn | 708/501 |
| 5,241,492 A | 8/1993 | Girardeau, Jr. | 708/523 |
| 5,522,085 A | 5/1996 | Harrison et al. | 712/32 |
| 5,530,663 A | 6/1996 | Garcia et al. | 708/501 |
| 5,680,578 A | 10/1997 | Dutton et al. | 711/154 |
| 5,692,207 A | 11/1997 | Ho-Lung et al. | 712/36 |
| 5,761,470 A | 6/1998 | Yoshida | 712/210 |
| 5,768,553 A | 6/1998 | Tran | 712/208 |

(Continued)

OTHER PUBLICATIONS

William Stallings, Computer Organization and Architecture 4th Edition, 1993, p. 313-386, Prentice-Hall, Inc. Upper Saddle River, NJ.

(Continued)

*Primary Examiner*—Kenneth S. Kim

(74) *Attorney, Agent, or Firm*—Blakely, Sokoloff, Taylor & Zafman LLP

(57) ABSTRACT

Methods of performing dyadic digital signal processing (DSP) instructions. In one embodiment of the invention, the method includes fetching a dyadic DSP instruction having a main operation and a sub operation; predecoding the dyadic DSP instruction to generate predecoded instruction signals; and decoding the predecoded instruction signals to generate select signals to selectively couple data from a first plurality of buses coupled to inputs of multiplexers of a first plurality of DSP functional blocks to execute the main operation of the dyadic DSP instruction in one processor cycle and to selectively couple data from a second plurality of buses coupled to inputs of multiplexers of a second plurality of DSP functional blocks to execute the sub operation of the dyadic DSP instruction in the one processor cycle.

13 Claims, 16 Drawing Sheets

U.S. PATENT DOCUMENTS

| | | | |
|---|---|---|---|
| 5,825,658 A | 10/1998 | Ginetti et al. | 716/6 |
| 5,880,984 A | 3/1999 | Burchfiel et al. | 708/501 |
| 5,901,301 A | 5/1999 | Matsuo et al. | 712/212 |
| 5,909,698 A | 6/1999 | Arimilli et al. | 711/145 |
| 5,923,871 A | 7/1999 | Gorshtein et al. | 712/221 |
| 5,940,785 A | 8/1999 | Georgiou et al. | 702/132 |
| 6,029,267 A | 2/2000 | Simanapalli et al. | 714/795 |
| 6,058,410 A | 5/2000 | Sharangpani | 708/551 |
| 6,115,806 A | 9/2000 | Yoshida | 712/210 |
| 6,121,998 A | 9/2000 | Voois et al. | 348/14.13 |
| 6,138,136 A | 10/2000 | Bauer et al. | 708/501 |
| 6,154,828 A | 11/2000 | Macri et al. | 712/24 |
| 6,154,831 A | 11/2000 | Thayer et al. | 712/208 |
| 6,247,036 B1 | 6/2001 | Landers et al. | 708/603 |
| 6,282,633 B1 | 8/2001 | Killian et al. | 712/208 |
| 6,360,312 B1 * | 3/2002 | Kawaguchi | 712/215 |
| 6,425,070 B1 | 7/2002 | Zou et al. | 712/35 |

OTHER PUBLICATIONS

Richard Fromm & David Martin, Instruction Set Architecture Simulation Infrastructure and Application Development for Vector IRAM, web site-ilpsoft.eecs.berkeley.edu:9636/~ilpsoft/99abstracts/rfromm.1.html.

Ted Dobry, Instruction Set Architecture, Web Based Course by UC Berkeley Undergraduate Advisor, Dated posted Aug. 20, 1999, web site-ee.eng.hawaii.edu/~tep/EE461/Notes/ISA/isa.html.

Jim McCormick, Supporting Predicated Execution: Techniques and Tradeoffs, MS Thesis, Department of Electrical and Computer Engineering, University of Illinois, Urbana, IL May 1996.

* cited by examiner

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|---|---|---|---|---|---|---|
| PS | | S' | | SX | | | | | | SY | | | | V/SA | DA | | Sub-op | | | 1 | Pred | | PL | | Sxt | | Syt | | Rnd | | S' | S' | S' | 0 | SA | DA | abs | 0 | 0 |
| 1 | 0 | 0 | | $da=+/- \ sx*sy$ | | | | | | | | | | Nop | | 0 | 0 | 0 | 0 | | | | | | | | | | | | | | | | | | | | |
| | | | | $da=+/- \ (sx*sy)+sa$ | | | | | | | | | | Add | | 0 | 0 | 0 | 1 | | | | | | | | | | | | Lt | | | | | | | | |
| | | | | $da=+/- \ (sx*sa)+sy$ | | | | | | | | | | Add | | 0 | 0 | 1 | 0 | | | | | | | | | | | | Lt | | | | | | | | |
| | | | | $da=+/- \ (sx*sy)-sa$ | | | | | | | | | | Sub | | 0 | 0 | 1 | 1 | | | | | | | | | | | | Lt | | | | | | | | |
| | | | | $da=+/- \ (sx*sa)-sy$ | | | | | | | | | | Sub | | 0 | 1 | 0 | 0 | | | | | | | | | | | | Lt | | | | | | | | |
| | | | | $da=min(+/- \ sx*sy,sa)$ | | | | | | | | | | Min | | 0 | 1 | 0 | 1 | | | | | | | | | | | | Gx | | | | | | | | |
| | | | | $da=min(+/- \ sx*sa,sy)$ | | | | | | | | | | Min | | 0 | 1 | 1 | 0 | | | | | | | | | | | | Gx | | | | | | | | |
| | | | | $da=max(+/- \ sx*sy,sa)$ | | | | | | | | | | Max | | 0 | 1 | 1 | 1 | | | | | | | | | | | | Gx | | | | | | | | |

FIG. 6C

| 39 | 38 | 37 | 36 | 35 | 34 | 33 | 32 | 31 | 30 | 29 | 28 | 27 | 26 | 25 | 24 | 23 | 22 | 21 | 20 | | |
|---|---|---|---|---|---|---|---|---|---|---|---|---|---|---|---|---|---|---|---|---|---|
| PS | | S' | | SX | | | | | | SY | | | | V/SA | DA | | | | | | |
| 1 | 0 | 0 | | | | | | | | | | | | | | 0 | 1 | 0 | 0 | Add | $da=+/- \ (mx*sa)+my$ |
| | | | | | | | | | | | | | | | | 1 | 0 | 0 | 0 | Sub | $da=+/- \ (mx*sa)-my$ |
| | | | | | | | | | | | | | | | | 1 | 1 | 1 | 0 | Min | $da=min(+/-mx*sa,my)$ |

FIG. 6D 20-bit ISA

| 39 | 19 | | |
|---|---|---|---|
| 0 | 0 | 20-bit parallel | Control () Control |
| 0 | 1 | 20-bit serial | Control # Control |
| 1 | 0 | 40-bit extended | DSP extensions/Shadow |
| 1 | 1 | 20-bit serial | DSP # DSP |

DSP instructions

| | 39 | 38 | 37 | 36 | 35 | 34 | 33 | 32 | 31 | 30 | 29 | 28 | 27 | 26 | 25 | 24 | 23 | 22 | 21 | 20 | |
|---|---|---|---|---|---|---|---|---|---|---|---|---|---|---|---|---|---|---|---|---|---|
| Multiply | 1 | 0 | 0 | PS | S' | | SX | | | | SY | | | | V/S | SA | DA | Sub-op | | | |
| da=sx*sy | | | | | | | | | | | | | | | | | | 0 | 0 | 0 | Nop |
| da=(sx*sy)+sa | | | | | | | | | | | | | | | | | | 0 | 0 | 1 | Add |
| da=(sx*sa)+sy | | | | | | | | | | | | | | | | | | 0 | 1 | 0 | Add |
| da=(sx*sy)+sa | | | | | | | | | | | | | | | | | | 0 | 1 | 1 | Sub |
| da=(sx*sa)+sy | | | | | | | | | | | | | | | | | | 1 | 0 | 0 | Sub |
| da=min(sx*sy,sa) | | | | | | | | | | | | | | | | | | 1 | 0 | 1 | Min |
| da=min(sx*sa,sy) | | | | | | | | | | | | | | | | | | 1 | 1 | 0 | Min |
| da=max(sx*sy,sa) | | | | | | | | | | | | | | | | | | 1 | 1 | 1 | Max |
| Add | 1 | 0 | 1 | PS | +/- | | SX | | | | SY | | | | V/S | SA | DA | Sub-op | | | |
| da=sx+sy | | | | | | | | | | | | | | | | | | 0 | 0 | 0 | Nop |
| da=sx+sy+sa | | | | | | | | | | | | | | | | | | 0 | 0 | 1 | Add |
| da=sx+sy: sa=sx+sy: | | | | | | | | | | | | | | | | | | 0 | 1 | 0 | AddSub |
| da=(sx+sy)*sa | | | | | | | | | | | | | | | | | | 0 | 1 | 1 | Mul |
| da=-(sx+sy)*sa | | | | | | | | | | | | | | | | | | 1 | 0 | 0 | MulN |
| da=min(sx+sy,sa) | | | | | | | | | | | | | | | | | | 1 | 0 | 1 | Min |
| da=max(sx+sy,sa) | | | | | | | | | | | | | | | | | | 1 | 1 | 0 | Max |
| da=ssum(sa)  (sx,sy unused) | | | | | | | | | | | | | | | | | | 1 | 1 | 1 | CombAdd |
| Extremum | 1 | 1 | 0 | PS | x/n | | SX | | | | SY | | | | V/S | SA | DA | Sub-op | | | |
| da=ext(sx,sy) | | | | | | | | | | | | | | | | | | 0 | 0 | 0 | Nop |
| da=ext(sx,sy,sa) | | | | | | | | | | | | | | | | | | 0 | 0 | 1 | Ext |
| da=ext(sx,sa)*sy | | | | | | | | | | | | | | | | | | 0 | 1 | 0 | Mul |
| da=-ext(sx,sa)*sy | | | | | | | | | | | | | | | | | | 0 | 1 | 1 | MulN |
| da=ext(sx,sa)+sy | | | | | | | | | | | | | | | | | | 1 | 0 | 0 | Add |
| da=ext(sx,sa)-sy | | | | | | | | | | | | | | | | | | 1 | 0 | 1 | Sub |
| ext(sa,da) ?1=sx,tr=sy,lcs=lc | | | | | | | | | | | | | | | | | | 1 | 1 | 0 | amax |
| type-match | 1 | 1 | 0 | PS | 0 | | SX | | | | SY | | | x | x | x | 1 | 1 | 1 | | |
| Permute | 1 | 1 | 0 | PS | 1 | | SX | | | | Type | | | x | ereg | | | 1 | 1 | 1 | Permute |
| Reserved | 1 | 1 | 1 | PS | x | | SX | | | | SY | | | | SA | DA | V/S | Sub-op | | | |

FIG. 6E-I

Control and specifier Extensions

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|

Mul

| 0 | Pred | PL | Sxt | Syt | Rnd | S' | S' | S' | 0 | SA | DA | abs | 0 | 0 |
|---|---|---|---|---|---|---|---|---|---|---|---|---|---|---|

Lt
Gx

Add/Sub
min/max

Add

| 0 | Pred | PL | Sxt | Syt | Lt | Sub-ext | 0 | SA | DA | abs | 0 | 0 |

+/− +/− +/− x
x V/S Rnd Fp
tr/ctl Gx Fp

Nop (uadd)
Mul/MulN
Min/Max

Ext

| 0 | Pred | PL | Sxt | Syt | tr-ctl | Gx | Sub-ext | 0 | SA | DA | abs | 0 | 0 |

Lt Fp
Rnd V/S

Add/sub
Mul

| 0 | Pred | PL | Sxt | Syt | Pctl1 | 0 | ereg | Pcll | 0 | 0 |

Type/offset/permute extensions

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| 0 | Pred | PL | x | Type:SX | | Type:SY | | 0 | SA | DA | x | 0 | 1 |
| 0 | Pred | PL | Psx | Permute:SX | | Permute:SY | | 0 | SA | DA | Psy | 1 | 0 |
| 0 | Pred | I/R | I/R | prX | Offset:SX | | Offset:SY | | 0 | SA | DA | prY | 1 | 1 |

Type override
permute override
Offset override

Shadow DSP

| 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|
| 0 | Op | PL | op | ereg | | ereg | | 1 | SA | DA | Sub-op | | |

FIG. 6E-2

Control instructions

| | 19 | 18 | 17 | 16 | 15 | 14 | 13 | 12 | 11 | 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|
| add,sub | L | Pred | | 0 | 0 | 0 | RX | | | | RY | | | | RZ | | | | +/- | 0 | |
| max,min | L | Pred | | 0 | 0 | 0 | RX | | | | RY | | | | RZ | | | | X/N | 1 | |
| Shift | L | Pred | | 0 | 0 | 1 | RX | | | | UI4 | | | | RZ | | | UI2 | R/L | | <Bit1,Bits9-6> |
| Logic | L | Pred | | 0 | 1 | 0 | RX | | | | RY | | | | RZ | | | &, | &1 | | ==UI5 (Shift |
| Mux | L | Pred | | 0 | 1 | 1 | RX | | | | RY | | | | RZ | | | Pd | 0 | | Amount) |
| mov | L | Pred | | 0 | 1 | 1 | RX | | | | DZ | | | Rxt | Dzl | 0 | 0 | 0 | 0 | 1 | |
| addi | L | Pred | | 0 | 1 | 1 | SI4 | | | | DZ | | | x | x | 1 | 0 | 0 | 1 | |
| mov2erg | L | Pred | | 0 | 1 | 1 | RX | | | | unit | | ereg | | qd | type | | 1 | 0 | 1 | |
| l.dm | L | Pred | | 0 | 1 | 1 | RX | | | | DZ1 | | | | DZ2 | | | 1 | 1 | 1 | |
| Set4bits | L | Pred | | 1 | 0 | 0 | UI4:POS | | | | RZ | | | Rzt | UI4 | | | | 0 | |
| Set2bits | L | Pred | | 1 | 0 | 0 | UI4:POS | | | | RZ | | | Rzt | UI2 | | 0 | 0 | 1 | |
| Setbit | L | Pred | | 1 | 0 | 0 | UI4:POS | | | | RZ | | | Rzt | UI1 | UI1 | 1 | 0 | 1 | <Bit3,Bits13- |
| Movi | L | Pred | | 1 | 0 | 0 | SI8 | | | | | | | | RZ | | | | 1 | 1 | 10>==UI5 POS |
| Jmp | L | Pred | | 1 | 0 | 1 | SI9 | | | | | | | | | 0 | PRED | | 0 | 0 | |
| Call | L | Pred | | 1 | 0 | 1 | SI9 | | | | | | | | | 1 | PRED | | 0 | 0 | |
| Loop | L | Pred | | 1 | 0 | 1 | UI5:Lcount | | | | UI5:Lsize | | | | UI2:Lst | | | 0 | 1 | |
| Jmpi | L | Pred | | 1 | 0 | 1 | RX | | | | x | x | x | x | x | 0 | PRED | | 1 | 0 | |
| Calli | L | Pred | | 1 | 0 | 1 | RX | | | | x | x | x | x | x | 1 | PRED | | 1 | 0 | |
| Loopi | L | Pred | | 1 | 0 | 1 | RX | | | | x | | UI5:Lsize | | | | UI2:Lst | | 1 | 1 | |
| Test | L | Pred | | 1 | 1 | 0 | RX | | | | RY | | | | PZ | | | =,<,> | 0 | |
| Testbit | L | Pred | | 1 | 1 | 0 | RX | | | | UI5 | | | | PZ | | | B | 0 | 1 | |
| Andp, orp | L | Pred | | 1 | 1 | 0 | Pa | | | Pb | | | Pc | | PZ | | | & | 1 | 1 | |
| Load | L | Pred | | 1 | 1 | 1 | MX | | | | RZ | | | | Ext | | | 0 | 0 | 0 | |
| Store | L | Pred | | 1 | 1 | 1 | MZ | | | | RZ | | | | Ext | | | 1 | 0 | 0 | |
| eLoad | L | Pred | | 1 | 1 | 1 | MX | | | | RY | | | | 1 | 1 | 1 | 0 | 1 | 0 | |
| eStore | L | Pred | | 1 | 1 | 1 | MZ | | | | RY | | | | 1 | 1 | 1 | 1 | 0 | 0 | |
| Extended | L | Pred | | 1 | 1 | 1 | Bits 27:16 | | | | | | | | | | | | 1 | 0 | |
| Logic2 | L | Pred | | 1 | 1 | 1 | RX | | | | RY/RZ | | | | Rxt | Ryt | &,1,&1,! | | 0 | 1 | |
| mov-erg | L | Pred | | 1 | 1 | 1 | unit | | | ereg | | | RZ | | qd | | Sft | | 0 | 1 | 1 | |
| Crb | L | Pred | | 1 | 1 | 1 | RX | | | | RZ | | | s/m | 0 | 0 | 1 | 1 | 1 | |
| Panty | L | Pred | | 1 | 1 | 1 | RX | | | | PZ | | | | 0/E | 0 | 1 | 0 | 1 | 1 | |
| Stm | L | Pred | | 1 | 1 | 1 | MZ | | | | RX | | | | 1 | 1 | 0 | 1 | 1 | 1 | |
| Abs | L | Pred | | 1 | 1 | 1 | RX | | | | RZ | | | | 0 | 0 | 1 | 1 | 1 | 1 | |
| Neg | L | Pred | | 1 | 1 | 1 | RX | | | | RZ | | | | 0 | 1 | 1 | 1 | 1 | 1 | |
| Div-step | L | Pred | | 1 | 1 | 1 | RX | | | | RZ | | | | 1 | 0 | 1 | 1 | 1 | 1 | |
| Test&Set | L | Pred | | 1 | 1 | 1 | RX | | | | PZ | | | 0 | 1 | 1 | 1 | 1 | 1 | |
| Reserved | L | Pred | | 1 | 1 | 1 | | | | | | 0 | 0 | 1 | 1 | 1 | 1 | 1 | 1 | |
| Return | L | Pred | | 1 | 1 | 1 | Pred | | | I-ctl | 0 | 1 | 0 | 1 | 1 | 1 | 1 | 1 | 1 | |
| Zero-ac | L | Pred | | 1 | 1 | 1 | ac # | | | | 1 | 1 | 0 | 1 | 1 | 1 | 1 | 1 | 1 | |
| eSync | L | Pred | | 1 | 1 | 1 | RZ | | | | 0 | 1 | 1 | 1 | 1 | 1 | 1 | 1 | 1 | |
| Swi | L | Pred | | 1 | 1 | 1 | UI3 | | 0 | 1 | 1 | 1 | 1 | 1 | 1 | 1 | 1 | 1 | |
| Nop | L | Pred | | 1 | 1 | 1 | UI3 | | 1 | 1 | 1 | 1 | 1 | 1 | 1 | 1 | 1 | 1 | |

7-bit specifier Parallel Store, Parallel Load in DSP instructions

| 6 | 5 | 4 | 3 | 2 | 1 | 0 | |
|---|---|---|---|---|---|---|---|
| M/R | | | | | | | |
| 0 | 0 | 0 | | SPR s0–s15 | | | |
| 0 | 0 | 1 | | reserved | | | |
| 0 | 1 | 0 | | ac-names | | | |
| 0 | 1 | 1 | | gpr: r0–r15 | | | |
| 1 | 0 | | ptr: (r0) to (r15) | | | off | Mem[ptr] \|\|\|ptr +=idx  Always postupdate |
| 1 | 1 | | offset: UI4 | | | off | Mem[ptr + idx]  ptrp14,p15  Always postupdate |

6-bit specifier DSP instructions

| 5 | 4 | 3 | 2 | 1 | 0 | |
|---|---|---|---|---|---|---|
| M/R | | | | | | |
| 0 | 0 | | ac-names | | | |
| 0 | 1 | | gpr: r0–r15 | | | |
| 1 | | ptr: (r0) to (r15) | | | off | Always postupdate |

5-bit specifier RISC instructions

| 4 | 3 | 2 | 1 | 0 |
|---|---|---|---|---|
| 0 | | spr: s0–s15 | | |
| 1 | | gpr: r0–r15 | | |

4-bit specifier

| 3 | 2 | 1 | 0 |
|---|---|---|---|
| gpr: r0–r15 | | | |
| ptr: (r0–r7) off | | | |
| ereg | | | |

AP

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| type | | | | permute | | | | CB | idxt: UI3 (0–7) | | | xhr0: Si5 (−16to15) | | | | | | pI | | | | | | | | | | | | | |

RISC instructions
20-bit DSP instructions
20-bit Shadow DSP instructions ac-names

| 3 | 2 | 1 | 0 |     |              |
|---|---|---|---|-----|--------------|
| 0 | 0 | 0 | 0 | A0  | (use type, SIMD) |
| 0 | 0 | 0 | 1 | A1  |              |
| 0 | 0 | 1 | 0 | T   |              |
| 0 | 0 | 1 | 1 | TR  |              |
| 0 | 1 | 0 | 0 | A00 | (unit 0)     |
| 0 | 1 | 0 | 1 | A10 |              |
| 0 | 1 | 1 | 0 | T0  |              |
| 0 | 1 | 1 | 1 | TR0 |              |
| 1 | 0 | 0 | 0 | SX1 |              |
| 1 | 0 | 0 | 1 | SX1s |             |
| 1 | 0 | 1 | 0 | SX2 |              |
| 1 | 0 | 1 | 1 | SX2s |             |
| 1 | 1 | 0 | 0 | SY1 |              |
| 1 | 1 | 0 | 1 | SY1s |             |
| 1 | 1 | 1 | 0 | SY2 |              |
| 1 | 1 | 1 | 1 | SY2s |             |

SPR:
gpr-type
ereg type
fu-ctl
pls-ctf
cb-ctl
loop-ctl
pcr
status ereg names

| 3 | 2 | 1 | 0 |      |
|---|---|---|---|------|
| 0 | 0 | 0 | 0 | A0   |
| 0 | 0 | 0 | 1 | A1   |
| 0 | 0 | 1 | 0 | T    |
| 0 | 0 | 1 | 1 | TR   |
| 0 | 1 | 0 | 0 | PP0  |
| 0 | 1 | 0 | 1 | Aout |
| 0 | 1 | 1 | 0 | PP1  |
| 0 | 1 | 1 | 1 | Dout |
| 1 | 0 | 0 | 0 | SX1  |
| 1 | 0 | 0 | 1 | SX1s |
| 1 | 0 | 1 | 0 | SX2  |
| 1 | 0 | 1 | 1 | SX2s |
| 1 | 1 | 0 | 0 | SY1  |
| 1 | 1 | 0 | 1 | SY1s |
| 1 | 1 | 1 | 0 | SY2  |
| 1 | 1 | 1 | 1 | SY2s |

FIG. 61-2

DYADIC DSP INSTRUCTION PREDECODE SIGNAL SELECTIVE MULTIPLEXING DATA FROM INPUT BUSES TO FIRST AND SECOND PLURALITY OF FUNCTIONAL BLOCKS TO EXECUTE MAIN AND SUB OPERATIONS

CROSS REFERENCE TO RELATED APPLICATION

This application is a divisional of U.S. patent application Ser. No. 09/494,608, filed Jan. 31, 2000, now issued as U.S. Pat. No. 6,446,195.

FIELD OF THE INVENTION

This invention relates generally to the instruction set architectures (ISA) of processors. More particularly, the invention relates to instruction set architectures for the execution of operations within a signal processing integrated circuit.

BACKGROUND OF THE INVENTION

Single chip digital signal processing devices (DSP) are relatively well known. DSPs generally are distinguished from general purpose microprocessors in that DSPs typically support accelerated arithmetic operations by including a dedicated multiplier and accumulator (MAC) for performing multiplication of digital numbers. The instruction set for a typical DSP device usually includes a MAC instruction for performing multiplication of new operands and addition with a prior accumulated value stored within an accumulator register. A MAC instruction is typically the only instruction provided in prior art digital signal processors where two DSP operations, multiply followed by add, are performed by the execution of one instruction. However, when performing signal processing functions on data it is often desirable to perform other DSP operations in varying combinations.

An area where DSPs may be utilized is in telecommunication systems. One use of DSPs in telecommunication systems is digital filtering. In this case a DSP is typically programmed with instructions to implement some filter function in the digital or time domain. The mathematical algorithm for a typical finite impulse response (FIR) filter may look like the equation $Y_n = h_0 X_0 + h_1 X_1 + h_2 X_2 + \ldots + h_N X_N$ where $h_n$ are fixed filter coefficients numbering from 1 to N and $X_n$ are the data samples. The equation $Y_n$ may be evaluated by using a software program. However in some applications, it is necessary that the equation be evaluated as fast as possible. One way to do this is to perform the computations using hardware components such as a DSP device programmed to compute the equation $Y_n$. In order to further speed the process, it is desirable to vectorize the equation and distribute the computation amongst multiple DSPs such that the final result is obtained more quickly. The multiple DSPs operate in parallel to speed the computation process. In this case, the multiplication of terms is spread across the multipliers of the DSPs equally for simultaneous computations of terms. The adding of terms is similarly spread equally across the adders of the DSPs for simultaneous computations. In vectorized processing, the order of processing terms is unimportant since the combination is associative. If the processing order of the terms is altered, it has no effect on the final result expected in a vectorized processing of a function.

In typical micro processors, a MAC operation would require a multiply instruction and an add instruction to perform both multiplication and addition. To perform these two instructions would require two processing cycles. Additionally, a program written for the typical micro processor would require a larger program memory in order to store the extra instructions necessary to perform the MAC operation. In prior art DSP devices, if a DSP operation other than a MAC DSP instruction need be performed, the operation requires separate arithmetic instructions programmed into program memory. These separate arithmetic instructions in prior art DSPs similarly require increased program memory space and processing cycles to perform the operation when compared to a single MAC instruction. It is desirable to reduce the number of processing cycles when performing DSP operations. It is desirable to reduce program memory requirements as well.

DSPs are often programmed in a loop to continuously perform accelerated arithmetic functions including a MAC instruction using different operands. Often times, multiple arithmetic instructions are programmed in a loop to operate on the same data set. The same arithmetic instruction is often executed over and over in a loop using different operands. Additionally, each time one instruction is completed, another instruction is fetched from the program stored in memory during a fetch cycle. Fetch cycles require one or more cycle times to access a memory before instruction execution occurs. Because circuits change state during a fetch cycle, power is consumed and thus it is desirable to reduce the number of fetch cycles. Typically, approximately twenty percent of power consumption may be utilized in the set up and clean up operations of a loop in order to execute DSP instructions. Typically, the loop execution where signal processing of data is performed consumes approximately eighty percent of power consumption with a significant portion being due to instruction fetching. Additionally, because data sets that a DSP device process are usually large, it is also desirable to speed instruction execution by avoiding frequent fetch cycles to memory.

Additionally, the quality of service over a telephone system often relates to the processing speed of signals. That is particularly the case when a DSP is to provide voice processing, such as voice compression, voice decompression, and echo cancellation for multiple channels. More recently, processing speed has become even more important because of the desire to transmit voice aggregated with data in a packetized form for communication over packetized networks. Delays in processing the packetized voice signal tend to result in the degradation of signal quality on receiving ends.

It is desirable to provide improved processing of voice and data signals to enhance the quality of voice and data communication over packetized networks. It is desirable to improve the efficiency of using computing resources when performing signal processing functions.

BRIEF SUMMARY OF THE INVENTION

Briefly, the present invention includes a method, apparatus and system as described in the claims. Multiple application specific signal processor (ASSP) having the instruction set architecture of the present invention, including the dyadic DSP instructions, are provided within gateways in communication systems to provide improved voice and data communication over a packetized network. Each ASSP includes a serial interface, a buffer memory, and four core processors for each to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay or other packetized network. The four signal processing units can execute the digital signal processing algorithms in parallel. Each ASSP is flexible and can be programmed to perform many network functions or data/voice processing functions, including voice and data compression/decompression in telecommunications systems (such as CODECs) particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the present invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units 300. The RISC ISA is a register based architecture including 16-registers within the register file 413, while the DSP ISA is a memory based architecture with efficient digital signal processing instructions. The instruction word for the ASSP is typically 20 bits but can be expanded to 40-bits to control two instructions to be executed in series or parallel, such as two RISC control instructions and extended DSP instructions. The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor of the type where D=[(A op1 B) op2 C] and each of "op1" and "op2" can be a multiply, add, extremum (min/max) or other primitive DSP class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two basic DSP operations in one instruction and includes a main DSP operation (MAIN OP) and a sub DSP operation (SUB OP). Generally, the instruction set architecture of the present invention can be generalized to combining any pair of basic DSP operations to provide very powerful dyadic instruction combinations. The DSP arithmetic instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode"). The present invention efficiently executes these dyadic DSP instructions by means of the instruction set architecture and the hardware architecture of the application specific signal processor. For example, the DSP instructions can process vector data or scalar data automatically using a single instruction and provide the appropriate vector or scalar output results.

BRIEF DESCRIPTIONS OF THE DRAWINGS

FIG. 6C is an exemplary bitmap for a control extended dyadic DSP instruction.

FIG. 6D is an exemplary bitmap for a non-extended dyadic DSP instruction.

FIGS. 6E and 6F list the set of 20-bit instructions for the ISA of the present invention.

FIG. 6G lists the set of extended control instructions for the ISA of the present invention.

FIG. 6H lists the set of 40-bit DSP instructions for the ISA of the present invention.

FIG. 6I lists the set of addressing instructions for the ISA of the present invention.

Figure 7:
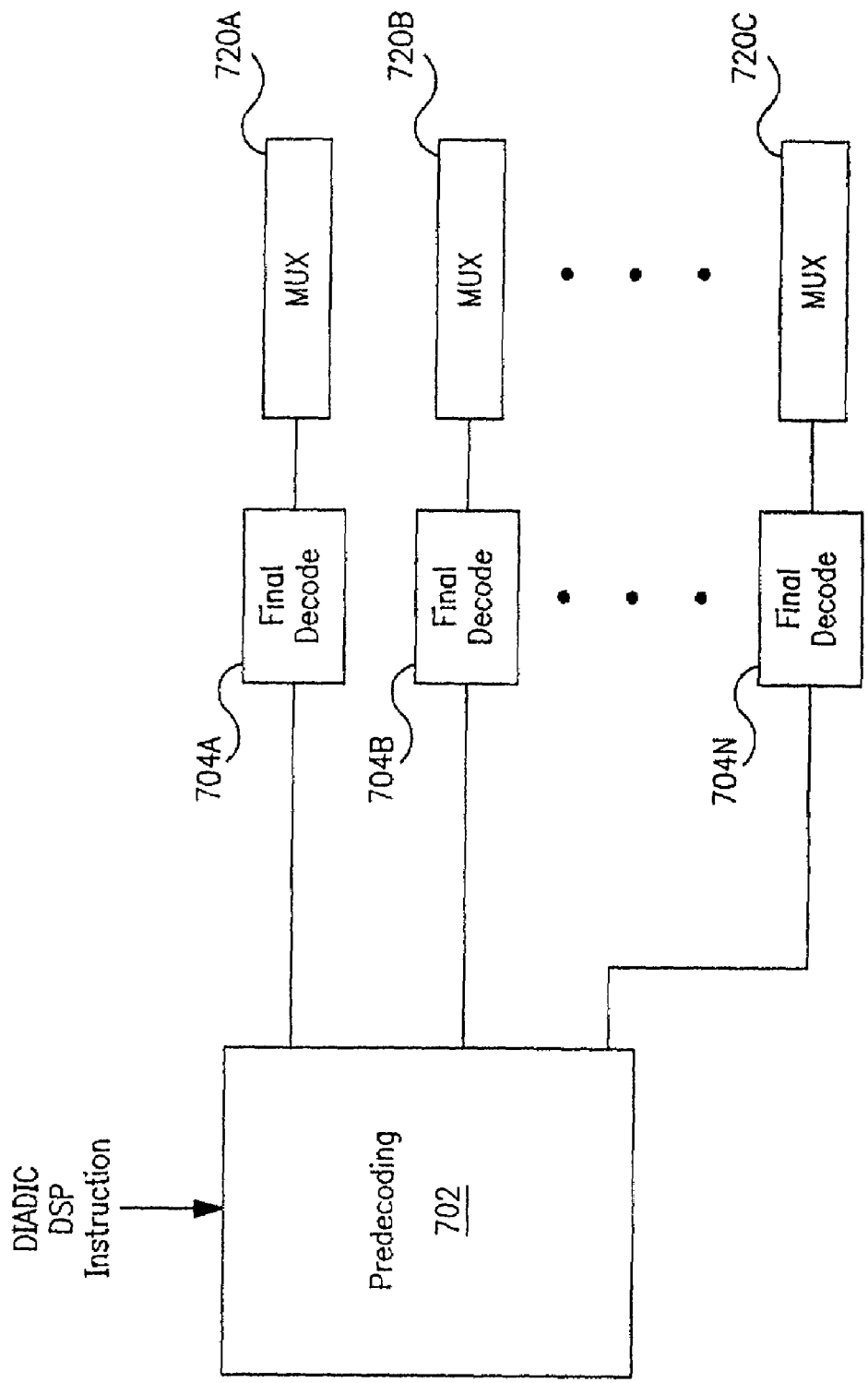

FIG. 7 is a block diagram illustrating the instruction decoding and configuration of the functional blocks of the signal processing units.

Like reference numbers and designations in the drawings indicate like elements providing similar functionality. A letter after a reference designator number represents an instance of an element having the reference designator number.

DETAILED DESCRIPTION OF THE PREFERRED EMBODIMENT

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention. Furthermore, the present invention will be described in particular embodiments but may be implemented in hardware, software, firmware or a combination thereof Multiple application specific signal processors (ASSPs) having the instruction set architecture of the present invention, including dyadic DSP instructions, are provided within gateways in communication systems to provide improved voice and data communication over a packetized network.

Each ASSP includes a serial interface, a buffer memory and four core processors in order to simultaneously process multiple channels of voice or data. Each core processor preferably includes a reduced instruction set computer (RISC) processor and four signal processing units (SPs). Each SP includes multiple arithmetic blocks to simultaneously process multiple voice and data communication signal samples for communication over IP, ATM, Frame Relay, or other packetized network. The four signal processing units can execute digital signal processing algorithms in parallel. Each ASSP is flexible and can be programmed to perform many network functions or data/voice processing functions, including voice and data compression/decompression in telecommunication systems (such as CODECs), particularly packetized telecommunication networks, simply by altering the software program controlling the commands executed by the ASSP.

An instruction set architecture for the ASSP is tailored to digital signal processing applications including audio and speech processing such as compression/decompression and echo cancellation. The instruction set architecture implemented with the ASSP, is adapted to DSP algorithmic structures. This adaptation of the ISA of the present invention to DSP algorithmic structures balances the ease of implementation, processing efficiency, and programmability of DSP algorithms. The instruction set architecture may be viewed as being two component parts, one (RISC ISA) corresponding to the RISC control unit and another (DSP ISA) to the DSP datapaths of the signal processing units 300. The RISC ISA is a register based architecture including 16-registers within the register file 413, while the DSP ISA is a memory based architecture with efficient digital signal processing instructions. The instruction word for the ASSP is typically 20 bits but can be expanded to 40-bits to control two instructions to the executed in series or parallel, such as two RISC control instruction and extended DSP instructions. The instruction set architecture of the ASSP has four distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor of the type where D=[(A op1 B) op2 C] and each of "op1" and "op2" can be a multiply, add or extremum (min/max) class of operation on the three operands A, B, and C. The ISA of the ASSP which accelerates these calculations allows efficient chaining of different combinations of operations.

All DSP instructions of the instruction set architecture of the ASSP are dyadic DSP instructions to execute two operations in one instruction with one cycle throughput. A dyadic DSP instruction is a combination of two DSP instructions or operations in one instruction and includes a main DSP operation (MAIN OP) and a sub DSP operation (SUB OP). Generally, the instruction set architecture of the present invention can be generalized to combining any pair of basic DSP operations to provide very powerful dyadic instruction combinations. The DSP arithmetic operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode").

The present invention efficiently executes these dyadic DSP instructions by means of the instruction set architecture and the hardware architecture of the application specific signal processor.

Figure 1A:
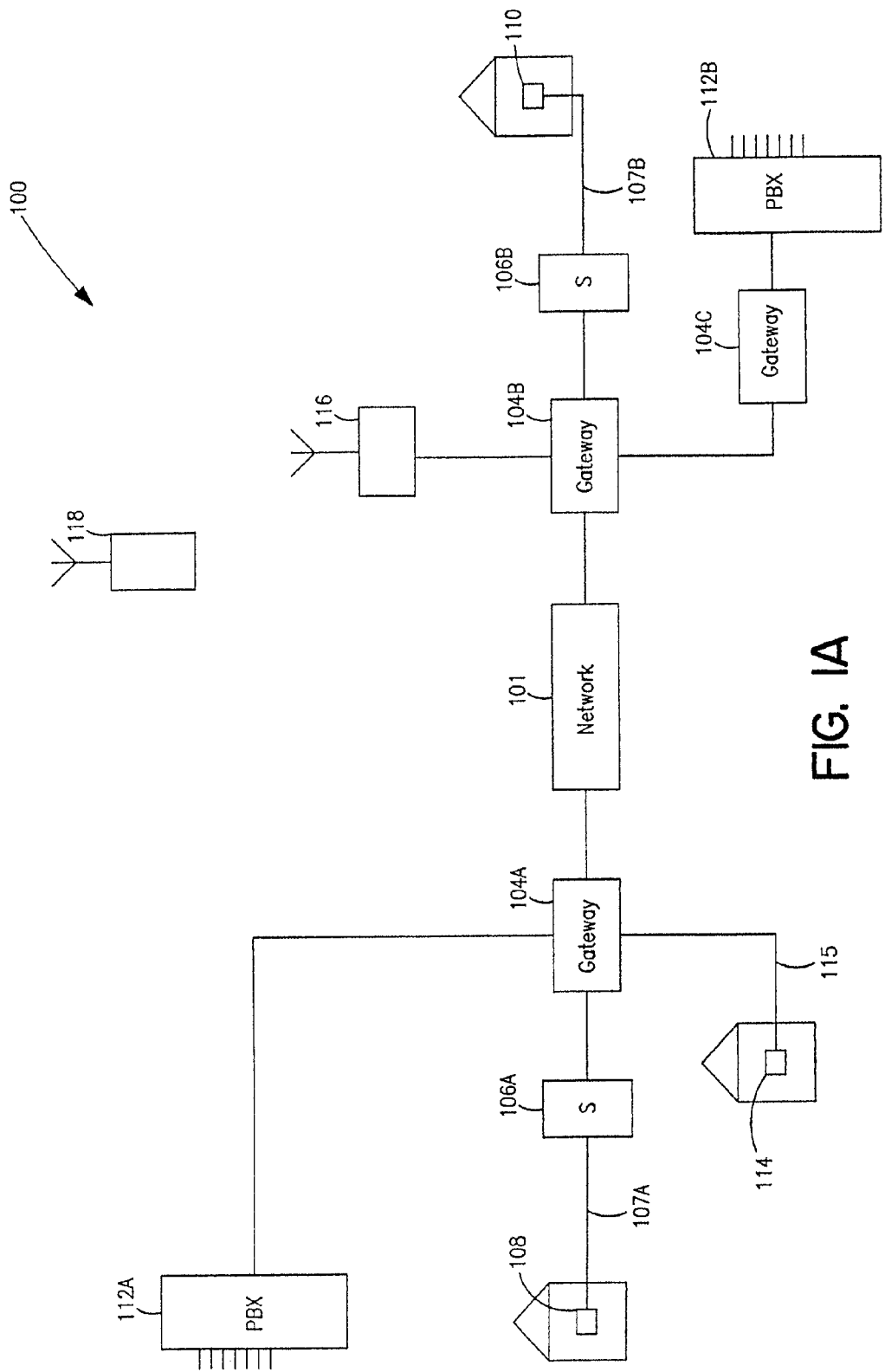
FIG. 1A is a block diagram of a system utilizing the present invention.

Referring now to FIG. 1A, a voice and data communication system 100 is illustrated. The system 100 includes a network 101 which is a packetized or packet-switched network, such as IP, ATM, or frame relay. The network 101 allows the communication of voice/speech and data between endpoints in the system 100, using packets. Data may be of any type including audio, video, email, and other generic forms of data. At each end of the system 100, the voice or data requires packetization when transceived across the network 101. The system 100 includes gateways 104A, 104B, and 104C in order to packetize the information received for transmission across the network 101. A gateway is a device for connecting multiple networks and devices that use different protocols. Voice and data information may be provided to a gateway 104 from a number of different sources in a variety of digital formats. In system 100, analog voice signals are transceived by a telephone 108. In system 100, digital voice signals are transceived at public branch exchanges (PBX) 112A and 112B which are coupled to multiple telephones, fax machines, or data modems. Digital voice signals are transceived between PBX 112A and PBX 112B with gateways 104A and 104C, respectively. Digital data signals may also be transceived directly between a digital modem 114 and a gateway 104A. Digital modem 114 may be a Digital Subscriber Line (DSL) modem or a cable modem. Data signals may also be coupled into system 100 by a wireless communication system by means of a mobile unit 118 transceiving digital signals or analog signals wirelessly to a base station 116. Base station 116 converts analog signals into digital signals or directly passes the digital signals to gateway 104B. Data may be transceived by means of modem signals over the plain old telephone system (POTS) 107B using a modem 110. Modem signals communicated over POTS 107B are traditionally analog in nature and are coupled into a switch 106B of the public switched telephone network (PSTN). At the switch 106B, analog signals from the POTS 107B are digitized and transceived to the gateway 104B by time division multiplexing (TDM) with each time slot representing a channel and one DS0 input to gateway 104B. At each of the gateways 104A, 104B and 104C, incoming signals are packetized for transmission across the network 101. Signals received by the gateways 104A, 104B and 104C from the network 101 are depacketized and transcoded for distribution to the appropriate destination.

Figure 1B:
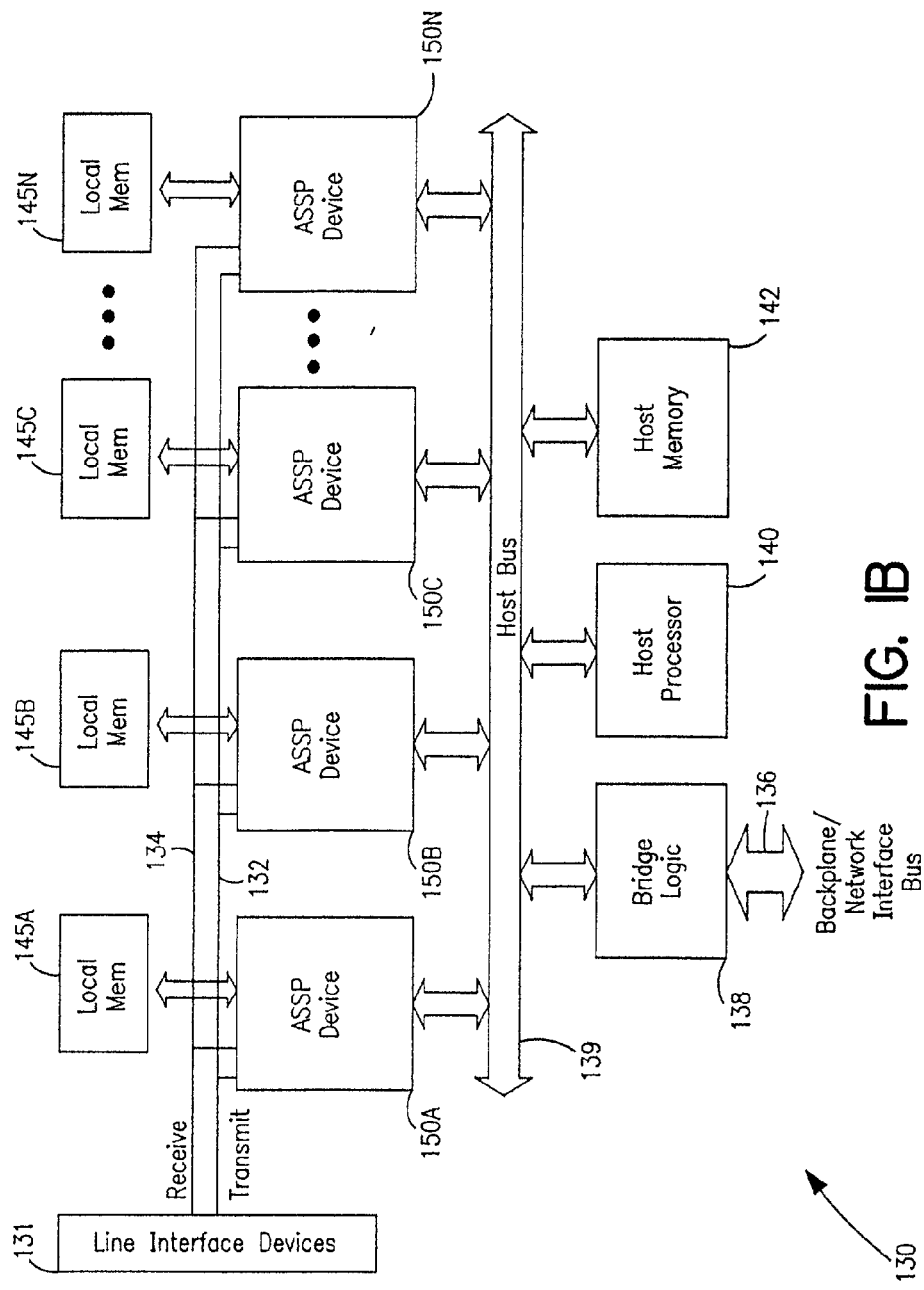
FIG. 1B is a block diagram of a printed circuit board utilizing the present invention within the gateways of the system in FIG. 1A.

Referring now to FIG. 1B, a network interface card (NIC) 130 of a gateway 104 is illustrated. The NIC 130 includes one or more application-specific signal processors (ASSPs) 150A–150N. The number of ASSPs within a gateway is expandable to handle additional channels. Line interface devices 131 of NIC 130 provide interfaces to various devices connected to the gateway, including the network 101. In interfacing to the network 101, the line interface devices packetize data for transmission out on the network 101 and depacketize data which is to be received by the ASSP devices. Line interface devices 131 process information received by the gateway on the receive bus 134 and provides it to the ASSP devices. Information from the ASSP devices 150 is communicated on the transmit bus 132 for transmission out of the gateway. A traditional line interface device is a multi-channel serial interface or a UTOPIA device. The NIC 130 couples to a gateway backplane/network interface bus 136 within the gateway 104. Bridge logic 138 transceives information between bus 136 and NIC 130. Bridge logic 138 transceives signals between the NIC 130 and the backplane/network interface bus 136 onto the host bus 139 for communication to either one or more of the ASSP devices 150A–150N, a host processor 140, or a host memory 142. Optionally coupled to each of the one or more ASSP devices 150A through 150N (generally referred to as ASSP 150) are optional local memory 145A through 145N (generally referred to as optional local memory 145), respectively. Digital data on the receive bus 134 and transmit bus 132 is preferably communicated in bit wide fashion. While internal memory within each ASSP may be sufficiently large to be used as a scratchpad memory, optional local memory 145 may be used by each of the ASSPs 150 if additional memory space is necessary.

Each of the ASSPs 150 provide signal processing capability for the gateway. The type of signal processing provided is flexible because each ASSP may execute differing signal processing programs. Typical signal processing and related voice packetization functions for an ASSP include (a) echo cancellation; (b) video, audio, and voice/speech compression/decompression (voice/speech coding and decoding); (c) delay handling (packets, frames); (d) loss handling; (e) connectivity (LAN and WAN); (f) security (encryption/decryption); (g) telephone connectivity; (h) protocol processing (reservation and transport protocols, RSVP, TCP/IP, RTP, UDP for IP, and AAL2, AAL1, AAL5 for ATM); (i) filtering; (j) Silence suppression; (k) length handling (frames, packets); and other digital signal processing functions associated with the communication of voice and data over a communication system. Each ASSP 150 can perform other functions in order to transmit voice and data to the various endpoints of the system 100 within a packet data stream over a packetized network.

Figure 2:
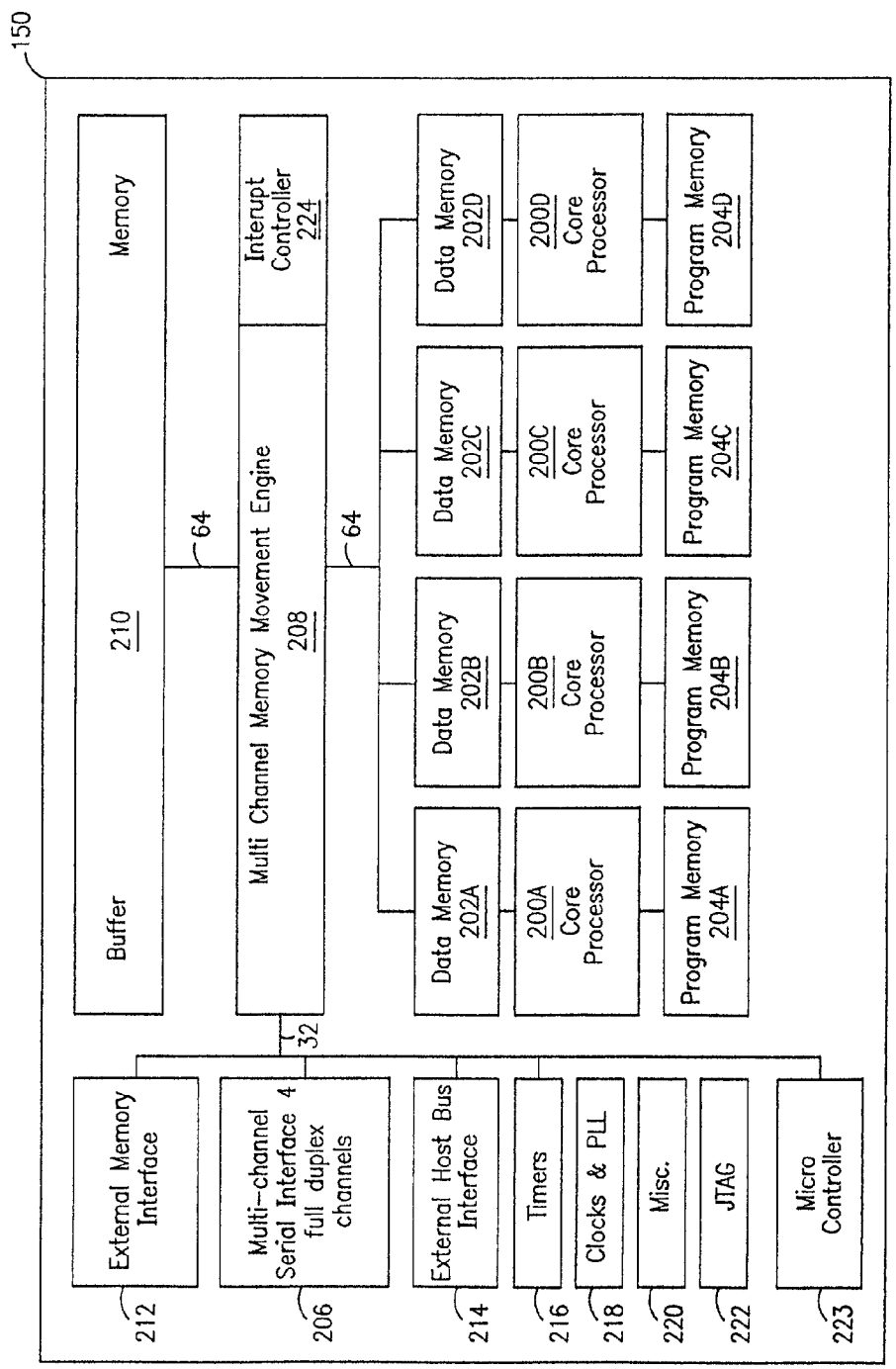
FIG. 2 is a block diagram of the Application Specific Signal Processor (ASSP) of the present invention.

Referring now to FIG. 2, a block diagram of the ASSP 150 is illustrated. At the heart of the ASSP 150 are four core processors 200A–200D. Each of the core processors 200A–200D is respectively coupled to a data memory 202A–202D and a program memory 204A–204D. Each of the core processors 200A–200D communicates with outside channels through the multi-channel serial interface 206, the multi-channel memory movement engine 208, buffer memory 210, and data memory 202A–202D. The ASSP 150 further includes an external memory interface 212 to couple to the external optional local memory 145. The ASSP 150 includes an external host interface 214 for interfacing to the external host processor 140 of FIG. 1B.—Further included within the ASSP 150 are timers 216, clock generators and a phase-lock loop 218, miscellaneous control logic 220, and a Joint Test Action Group (JTAG) test access port 222 for boundary scan testing. The multi-channel serial interface 206 may be replaced with a UTOPIA parallel interface for some applications such as ATM. The ASSP 150 further includes a microcontroller 223 to perform process scheduling for the core processors 200A–200D and the coordination of the data movement within the ASSP as well as an interrupt controller 224 to assist in interrupt handling and the control of the ASSP 150.

Figure 3:
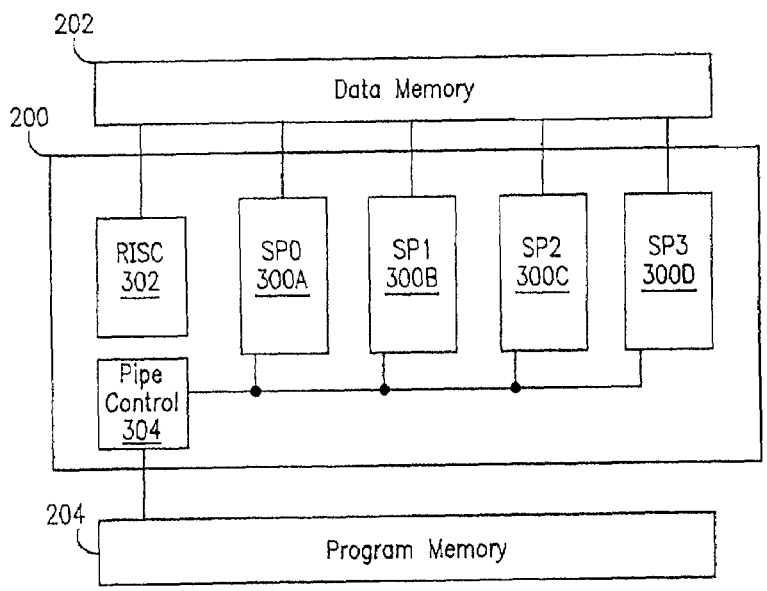
FIG. 3 is a block diagram of an instance of the core processors within the ASSP of the present invention.

Referring now to FIG. 3, a block diagram of the core processor 200 is illustrated coupled to its respective data memory 202 and program memory 204. Core processor 200 is the block diagram for each of the core processors 200A–200D. Data memory 202 and program memory 204 refers to a respective instance of data memory 202A–202D and program memory 204A–204D, respectively. The core processor 200 includes four signal processing units SP0 300A, SP1 300B, SP2 300C and SP3 300D. The core processor 200 further includes a reduced instruction set computer (RISC) control unit 302 and a pipeline control unit 304. The signal processing units 300A–300D perform the signal processing tasks on data while the RISC control unit 302 and the pipeline control unit 304 perform control tasks related to the signal processing function performed by the SPs 300A–300D. The control provided by the RISC control unit 302 is coupled with the SPs 300A–300D at the pipeline level to yield a tightly integrated core processor 200 that keeps the utilization of the signal processing units 300 at a very high level.

The signal processing tasks are performed on the datapaths within the signal processing units 300A–300D. The nature of the DSP algorithms are such that they are inherently vector operations on streams of data, that have minimal temporal locality (data reuse). Hence, a data cache with demand paging is not used because it would not function well and would degrade operational performance. Therefore, the signal processing units 300A–300D are allowed to access vector elements (the operands) directly from data memory 202 without the overhead of issuing a number of load and store instructions into memory resulting, in very efficient data processing. Thus, the instruction set architecture of the present invention having a 20 bit instruction word which can be expanded to a 40 bit instruction word, achieves better efficiencies than VLIW architectures using 256-bits or higher instruction widths by adapting the ISA to DSP algorithmic structures. The adapted ISA leads to very compact and low-power hardware that can scale to higher computational requirements. The operands that the ASSP can accommodate are varied in data type and data size. The data type may be real or complex, an integer value or a fractional value, with vectors having multiple elements of different sizes. The data size in the preferred embodiment is 64 bits but larger data sizes can be accommodated with proper instruction coding.

Figure 4:
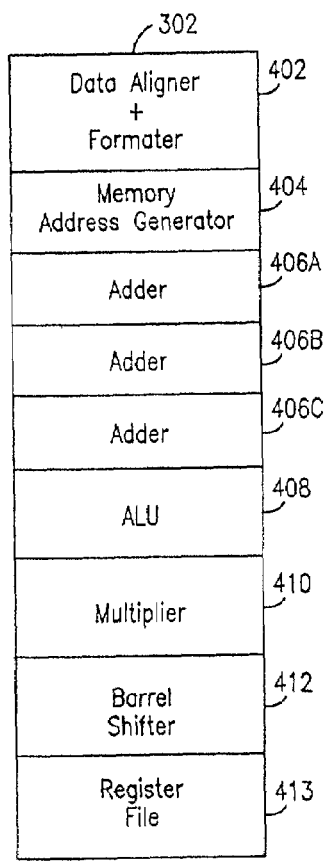
FIG. 4 is a block diagram of the RISC processing unit within the core processors of FIG. 3.

Referring now to FIG. 4, a detailed block diagram of the RISC control unit 302 is illustrated. RISC control unit 302 includes a data aligner and formatter 402, a memory address generator 404, three adders 406A–406C, an arithmetic logic unit (ALU) 408, a multiplier 410, a barrel shifter 412, and a register file 413. The register file 413 points to a starting memory location from which memory address generator 404 can generate addresses into data memory 202. The RISC control unit 302 is responsible for supplying addresses to data memory so that the proper data stream is fed to the signal processing units 300A–300D. The RISC control unit 302 is a register to register organization with load and store instructions to move data to and from data memory 202. Data memory addressing is performed by RISC control unit using a 32-bit register as a pointer that specifies the address, post-modification offset, and type and permute fields. The type field allows a variety of natural DSP data to be supported as a "first class citizen" in the architecture. For instance, the complex type allows direct operations on complex data stored in memory removing a number of bookkeeping instructions. This is useful in supporting QAM demodulators in data modems very efficiently.

Figure 5A:
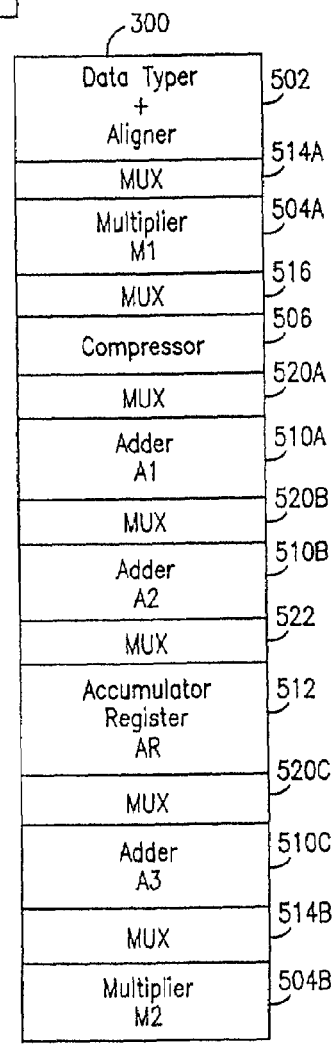
FIG. 5A is a block diagram of an instance of the signal processing units within the core processors of FIG. 3.

Referring now to FIG. 5A, a block diagram of a signal processing unit 300 is illustrated which represents an instance of the SPs 300A–300D. Each of the signal processing units 300 includes a data typer and aligner 502, a first multiplier M1 504A, a compressor 506, a first adder A1 510A, a second adder A2 510B, an accumulator register 512, a third adder A3 510C, and a second multiplier M2 504B. Adders 510A–510C are similar in structure and are generally referred to as adder 510. Multipliers 504A and 504B are similar in structure and generally referred to as multiplier 504. Each of the multipliers 504A and 504B have a multiplexer 514A and 514B respectively at its input stage to multiplex different inputs from different busses into the multipliers. Each of the adders 510A, 510B, 510C also have a multiplexer 520A, 520B, and 520C respectively at its input stage to multiplex different inputs from different busses into the adders. These multiplexers and other control logic allow the adders, multipliers and other components within the signal processing units 300A–300C to be flexibly interconnected by proper selection of multiplexers. In the preferred embodiment, multiplier M1 504A, compressor 506, adder A1 510A, adder A2 510B and accumulator 512 can receive inputs directly from external data buses through the data typer and aligner 502. In the preferred embodiment, adder 510C and multiplier M2 504B receive inputs from the accumulator 512 or the outputs from the execution units multiplier M1 504A, compressor 506, adder A1 510A, and adder A2 510B.

Program memory 204 couples to the pipe control 304 which includes an instruction buffer that acts as a local loop cache. The instruction buffer in the preferred embodiment has the capability of holding four instructions. The instruction buffer of the pipe control 304 reduces the power consumed in accessing the main memories to fetch instructions during the execution of program loops.

Figure 5B:
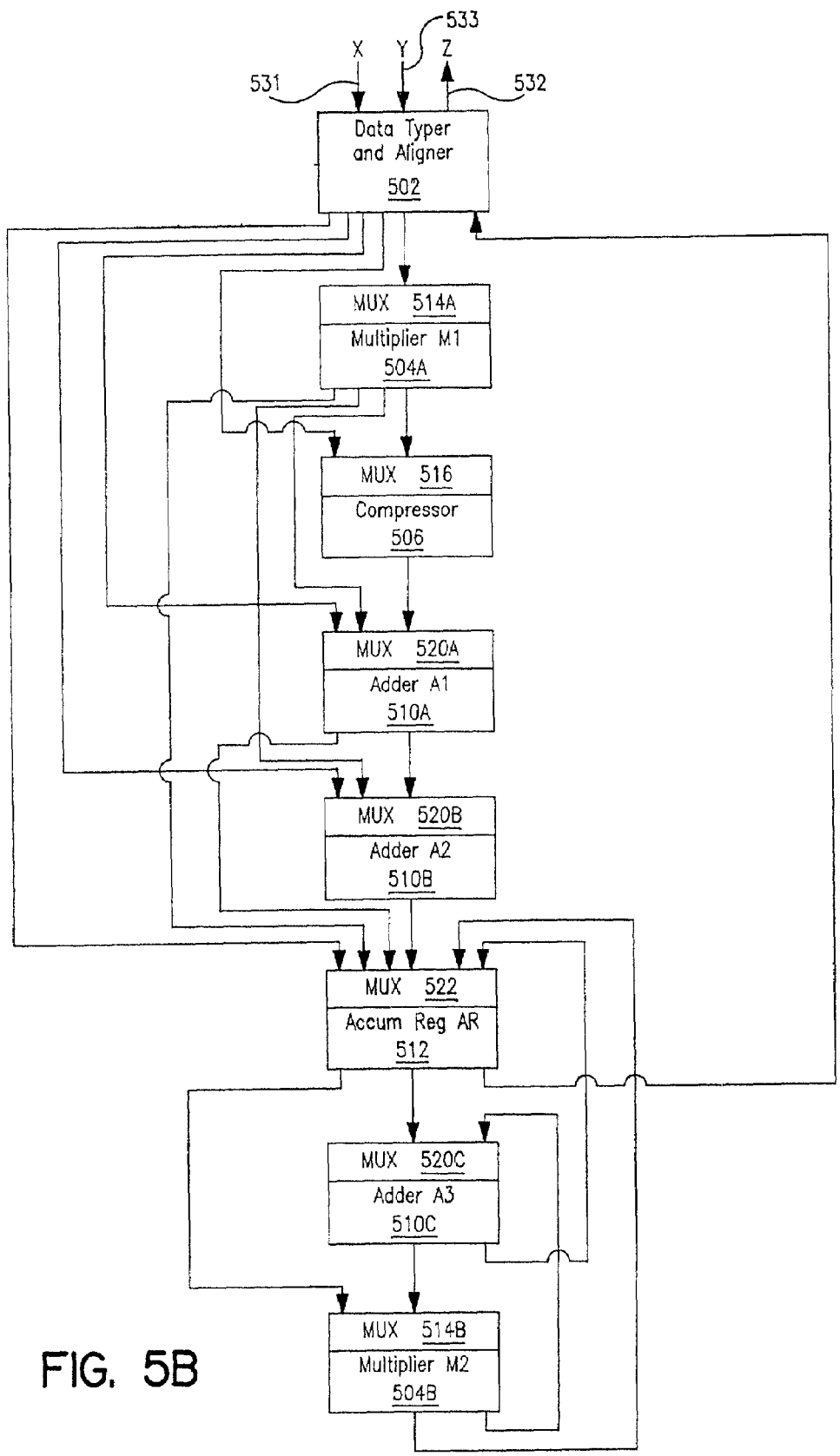
FIG. 5B is a more detailed block diagram of FIG. 5A illustrating the bus structure of the signal processing unit.

Referring now to FIG. 5B, a more detailed block diagram of the functional blocks and the bus structure of the signal processing unit is illustrated. Dyadic DSP instructions are possible because of the structure and functionality provided in each signal processing unit. Output signals are coupled out of the signal processor 300 on the Z output bus 532 through the data typer and aligner 502. Input signals are coupled into the signal processor 300 on the X input bus 531 and Y input bus 533 through the data typer and aligner 502. Internally, the data typer and aligner 502 has a different data bus to couple to each of multiplier M1 504A, compressor 506, adder A1 510A, adder A2 510B, and accumulator register AR 512. While the data typer and aligner 502 could have data busses coupling to the adder A3 510C and the multiplier M2 504B, in the preferred embodiment it does not in order to avoid extra data lines and conserve area usage of an integrated circuit. Output data is coupled from the accumulator register AR 512 into the data typer and aligner 502. Multiplier M1 504A has buses to couple its output into the inputs of the compressor 506, adder A1 510A, adder A2 510B, and the accumulator registers AR 512. Compressor 506 has buses to couple its output into the inputs of adder A1 510A and adder A2 510B. Adder A1 510A has a bus to couple its output into the accumulator registers 512. Adder A2 510B has buses to couple its output into the accumulator registers 512. Accumulator registers 512 has buses to couple its output into multiplier M2 504B, adder A3 510C, and data typer and aligner 502. Adder A3 510C has buses to couple its output into the multiplier M2 504B and the accumulator registers 512. Multiplier M2 504B has buses to couple its output into the inputs of the adder A3 510C and the accumulator registers AR 512.

Instruction Set Architecture

The instruction set architecture of the ASSP 150 is tailored to digital signal processing applications including audio and speech processing such as compression/decompression and echo cancellation. In essence, the instruction set architecture implemented with the ASSP 150, is adapted to DSP algorithmic structures. The adaptation of the ISA of the present invention to DSP algorithmic structures is a balance between ease of implementation, processing efficiency, and programmability of DSP algorithms. The ISA of the present invention provides for data movement operations, DSP/arithmetic/logical operations, program control operations (such as function calls/returns, unconditional/conditional jumps and branches), and system operations (such as privilege, interrupt/trap/hazard handling and memory management control).

Figure 6A:
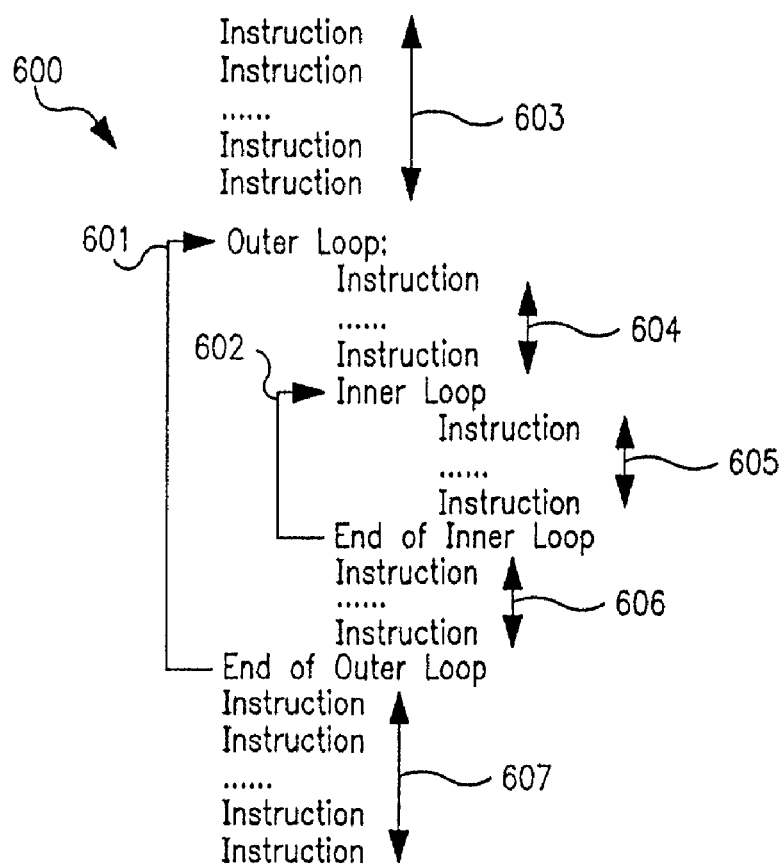
FIG. 6A is an exemplary instruction sequence illustrating a program model for DSP algorithms employing the instruction set architecture of the present invention.

Referring now to FIG. 6A, an exemplary instruction sequence 600 is illustrated for a DSP algorithm program model employing the instruction set architecture of the present invention. The instruction sequence 600 has an outer loop 601 and an inner loop 602. Because DSP algorithms tend to perform repetitive computations, instructions 605 within the inner loop 602 are executed more often than others. Instructions 603 are typically parameter setup code to set the memory pointers, provide for the setup of the outer loop 601, and other 2×20 control instructions. Instructions 607 are typically context save and function return instructions or other 2×20 control instructions. Instructions 603 and 607 are often considered overhead instructions which are typically infrequently executed. Instructions 604 are typically to provide the setup for the inner loop 602, other control through 2×20 control instructions, or offset extensions for pointer backup. Instructions 606 typically provide tear down of the inner loop 602, other control through 2×20 control instructions, and combining of datapath results within the signal processing units. Instructions 605 within the inner loop 602 typically provide inner loop execution of DSP operations, control of the four signal processing units 300 in a single instruction multiple data execution mode, memory access for operands, dyadic DSP operations, and other DSP functionality through the 20/40 bit DSP instructions of the ISA of the present invention. Because instructions 605 are so often repeated, significant improvement in operational efficiency may be had by providing the DSP instructions, including general dyadic instructions and dyadic DSP instructions, within the ISA of the present invention.

The instruction set architecture of the ASSP 150 can be viewed as being two component parts, one (RISC ISA) corresponding to the RISC control unit and another (DSP ISA) to the DSP datapaths of the signal processing units 300. The RISC ISA is a register based architecture including sixteen registers within the register file 413, while the DSP ISA is a memory based architecture with efficient digital signal processing instructions. The instruction word for the ASSP is typically 20 bits but can be expanded to 40-bits to control two RISC or DSP instructions to be executed in series or parallel, such as a RISC control instruction executed in parallel with a DSP instruction, or a 40 bit extended RISC or DSP instruction.

The instruction set architecture of the ASSP 150 has 4 distinct types of instructions to optimize the DSP operational mix. These are (1) a 20-bit DSP instruction that uses mode bits in control registers (i.e. mode registers), (2) a 40-bit DSP instruction having control extensions that can override mode registers, (3) a 20-bit dyadic DSP instruction, and (4) a 40 bit dyadic DSP instruction. These instructions are for accelerating calculations within the core processor 200 of the type where D=[(A op1 B) op2 C] and each of "op1" and "op2" can be a multiply, add or extremum (min/max) class of operation on the three operands A, B, and C. The ISA of the ASSP 150 which accelerates these calculations allows efficient chaining of different combinations of operations.

Because these type of operations require three operands, they must be available to the processor. However, because the device size places limits on the bus structure, bandwidth is limited to two vector reads and one vector write each cycle into and out of data memory 202. Thus one of the operands, such as B or C, needs to come from another source within the core processor 200. The third operand can be placed into one of the registers of the accumulator 512 or the RISC register file 413. In order to accomplish this within the core processor 200 there are two subclasses of the 20-bit DSP instructions which are (1) A and B specified by a 4-bit specifier, and C and D by a 1-bit specifier and (2) A and C specified by a 4-bit specifier, and B and D by a 1 bit specifier.

Instructions for the ASSP are always fetched 40-bits at a time from program memory with bit 39 and 19 indicating the type of instruction. After fetching, the instruction is grouped into two sections of 20 bits each for execution of operations. In the case of 20-bit control instructions with parallel execution (bit 39=0, bit 19=0), the two 20-bit sections are control instructions that are executed simultaneously. In the case of 20-bit control instructions for serial execution (bit 39=0, bit 19=1), the two 20-bit sections are control instructions that are executed serially. In the case of 20-bit DSP instructions for serial execution (bit 39=1, bit 19=1), the two 20-bit sections are DSP instructions that are executed serially. In the case of 40-bit DSP instructions (bit 39=1, bit 19=0), the two 20 bit sections form one extended DSP instruction which are executed simultaneously.

The ISA of the ASSP 150 is fully predicated providing for execution prediction. Within the 20-bit RISC control instruction word and the 40-bit extended DSP instruction word there are 2 bits of each instruction specifying one of four predicate registers within the RISC control unit 302. Depending upon the condition of the predicate register, instruction execution can conditionally change base on its contents.

In order to access operands within the data memory 202 or registers within the accumulator 512 or register file 413, a 6-bit specifier is used in the DSP extended instructions to access operands in memory and registers. Of the six bit specifier used in the extended DSP instructions, the MSB (Bit 5) indicates whether the access is a memory access or register access. In the preferred embodiment, if Bit 5 is set to logical one, it denotes a memory access for an operand. If Bit 5 is set to a logical zero, it denotes a register access for an operand. If Bit 5 is set to 1, the contents of a specified register (rX where X: 0–7) are used to obtain the effective memory address and post-modify the pointer field by one of two possible offsets specified in one of the specified rX registers. If Bit 5 is set to 0, Bit 4 determines what register set has the contents of the desired operand. If Bit-4 is set to 0, then the remaining specified bits 3:0 control access to the registers within the register file 413 or to registers within the signal processing units 300.

DSP Instructions

There are four major classes of DSP instructions for the ASSP 150 these are:
1) Multiply (MULT): Controls the execution of the main multiplier connected to data buses from memory. Controls: Rounding, sign of multiply Operates on vector data specified through type field in address register Second operation: Add, Sub, Min, Max in vector or scalar mode
2) Add (ADD): Controls the execution of the main-adder Controls: absolute value control of the inputs, limiting the result Second operation: Add, add-sub, mult, mac, min, max
3) Extremum (MIN/MAX): Controls the execution of the main-adder Controls: absolute value control of the inputs, Global or running max/min with T register, TR register recording control Second operation: add, sub, mult, mac, min, max
4) Misc: type-match and permute operations.

The ASSP 150 can execute these DSP arithmetic operations in vector or scalar fashion. In scalar execution, a reduction or combining operation is performed on the vector results to yield a scalar result. It is common in DSP applications to perform scalar operations, which are efficiently performed by the ASSP 150.

The 20-bit DSP instruction words have 4-bit operand specifiers that can directly access data memory using 8 address registers (r0–r7) within the register file 413 of the RISC control unit 302. The method of addressing by the 20 bit DSP instruction word is regular indirect with the address register specifying the pointer into memory, post-modification value, type of data accessed and permutation of the data needed to execute the algorithm efficiently. All of the DSP instructions control the multipliers 504A–504B, adders 510A–510C, compressor 506 and the accumulator 512, the functional units of each signal processing unit 300A–300D.

In the 40 bit instruction word, the type of extension from the 20 bit instruction word falls into five categories:
1) Control and Specifier extensions that override the control bits in mode registers
2) Type extensions that override the type specifier in address registers
3) Permute extensions that override the permute specifier for vector data in address registers
4) Offset extensions that can replace or extend the offsets specified in the address registers
5) DSP extensions that control the lower rows of functional units within a signal processing unit 300 to accelerate block processing.

The 40-bit control instructions with the 20 bit extensions further allow a large immediate value (16 to 20 bits) to be specified in the instruction and powerful bit manipulation instructions.

Efficient DSP execution is provided with 2×20-bit DSP instructions with the first 20-bits controlling the top functional units (adders 501A and 510B, multiplier 504A, compressor 506) that interface to data buses from memory and the second 20 bits controlling the bottom functional units (adder 510C and multiplier 504B) that use internal or local data as operands. The top functional units, also referred to as main units, reduce the inner loop cycles in the inner loop 602 by parallelizing across consecutive taps or sections. The bottom functional units cut the outer loop cycles in the outer loop 601 in half by parallelizing block DSP algorithms across consecutive samples.

Efficient DSP execution is also improved by the hardware architecture of the present invention. In this case, efficiency is improved in the manner that data is supplied to and from data memory 202 to feed the four signal processing units 300 and the DSP functional units therein. The data highway is comprised of two buses, X bus 531 and Y bus 533, for X and Y source operands, and one Z bus 532 for a result write. All buses, including X bus 531, Y bus 533, and Z bus 532, are preferably 64 bits wide. The buses are uni-directional to simplify the physical design and reduce transit times of data.

In the preferred embodiment when in a 20 bit DSP mode, if the X and Y buses are both carrying operands read from memory for parallel execution in a signal processing unit 300, the parallel load field can only access registers within the register file 413 of the RISC control unit 302. Additionally, the four signal processing units 300A–300D in parallel provide four parallel MAC units (multiplier 504A, adder 510A, and accumulator 512) that can make simultaneous computations. This reduces the cycle count from 4 cycles ordinarily required to perform four MACs to only one cycle.

Dyadic DSP Instructions

Figure 6B:
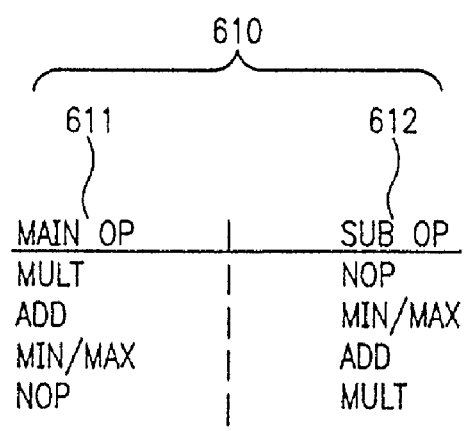
FIG. 6B is a chart illustrating the permutations of the dyadic DSP instructions.
Figure 6G:
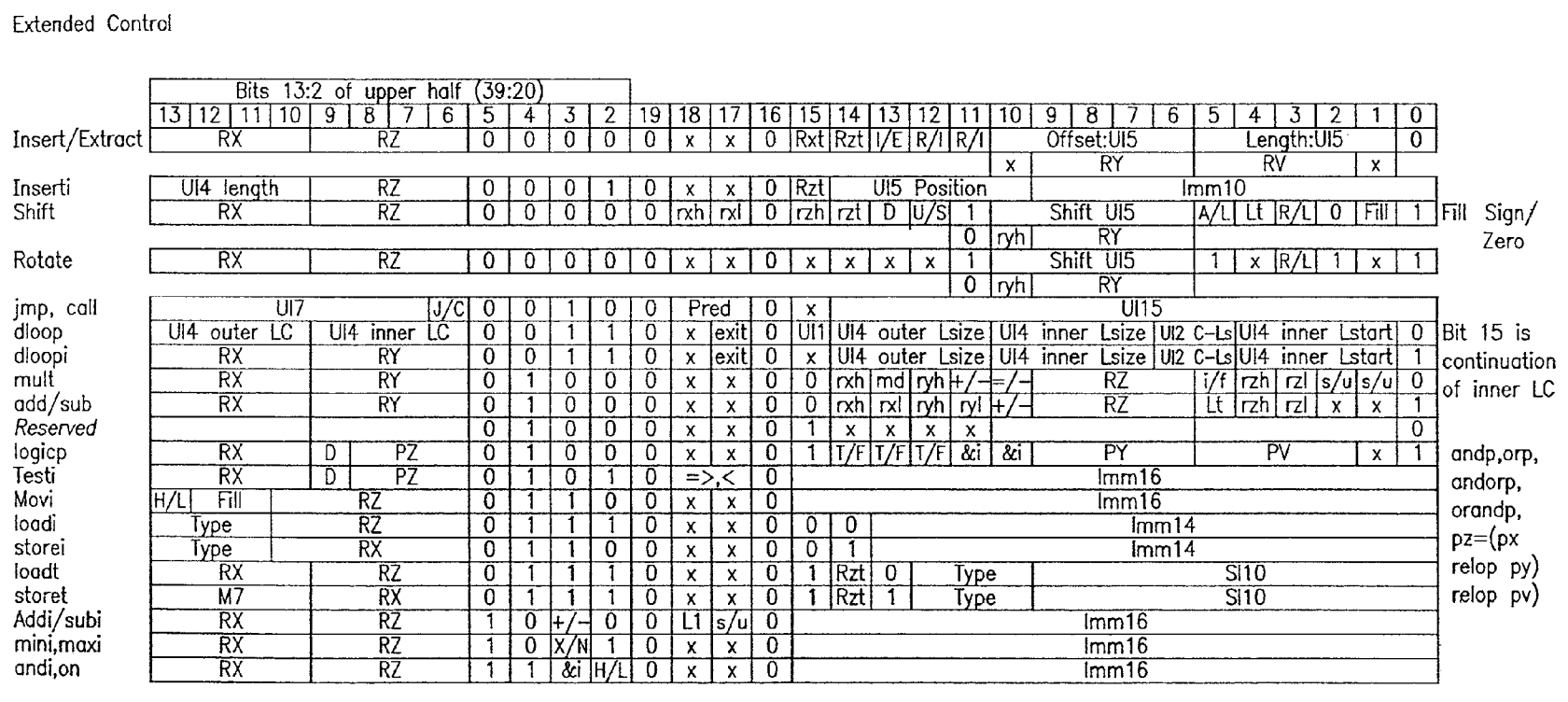
Figure 6H:
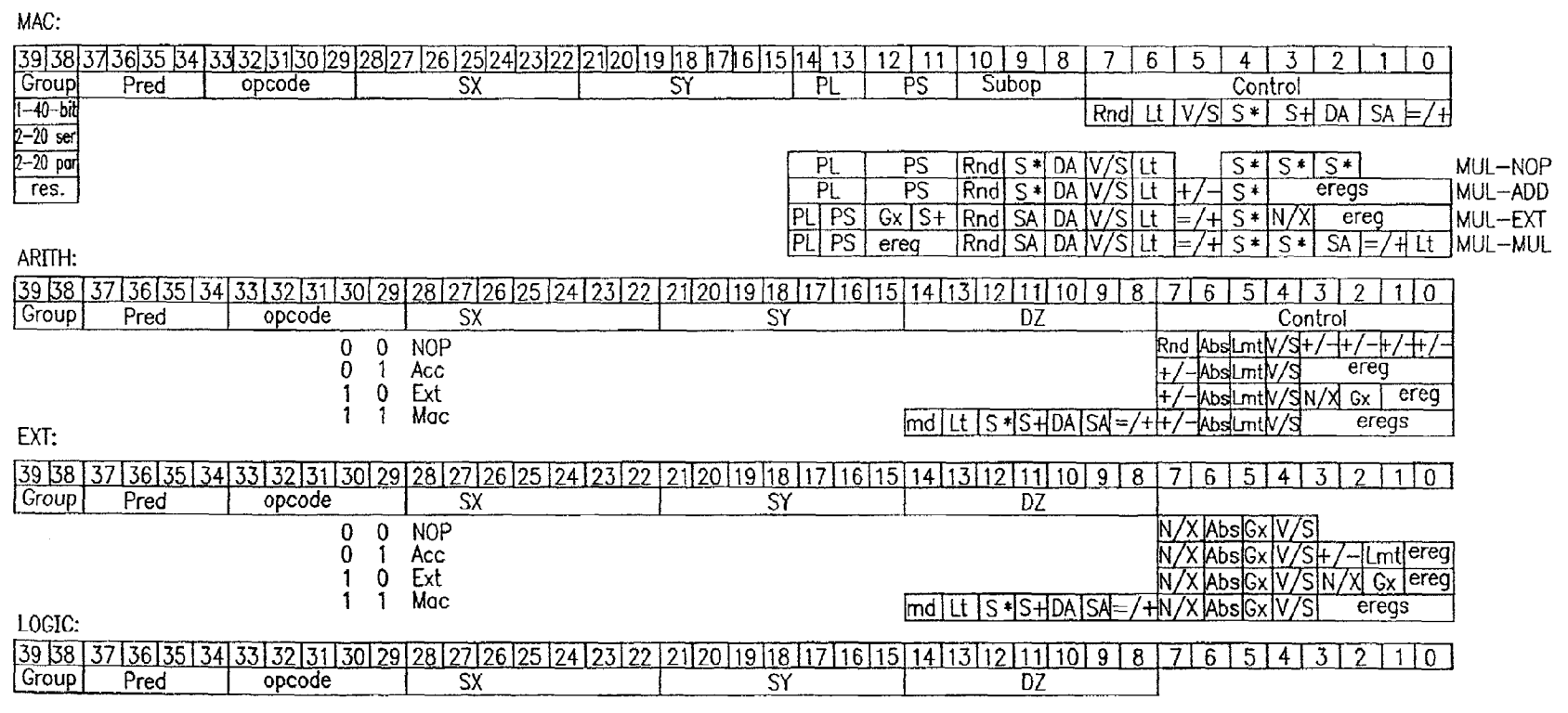
Figure 6H-2:
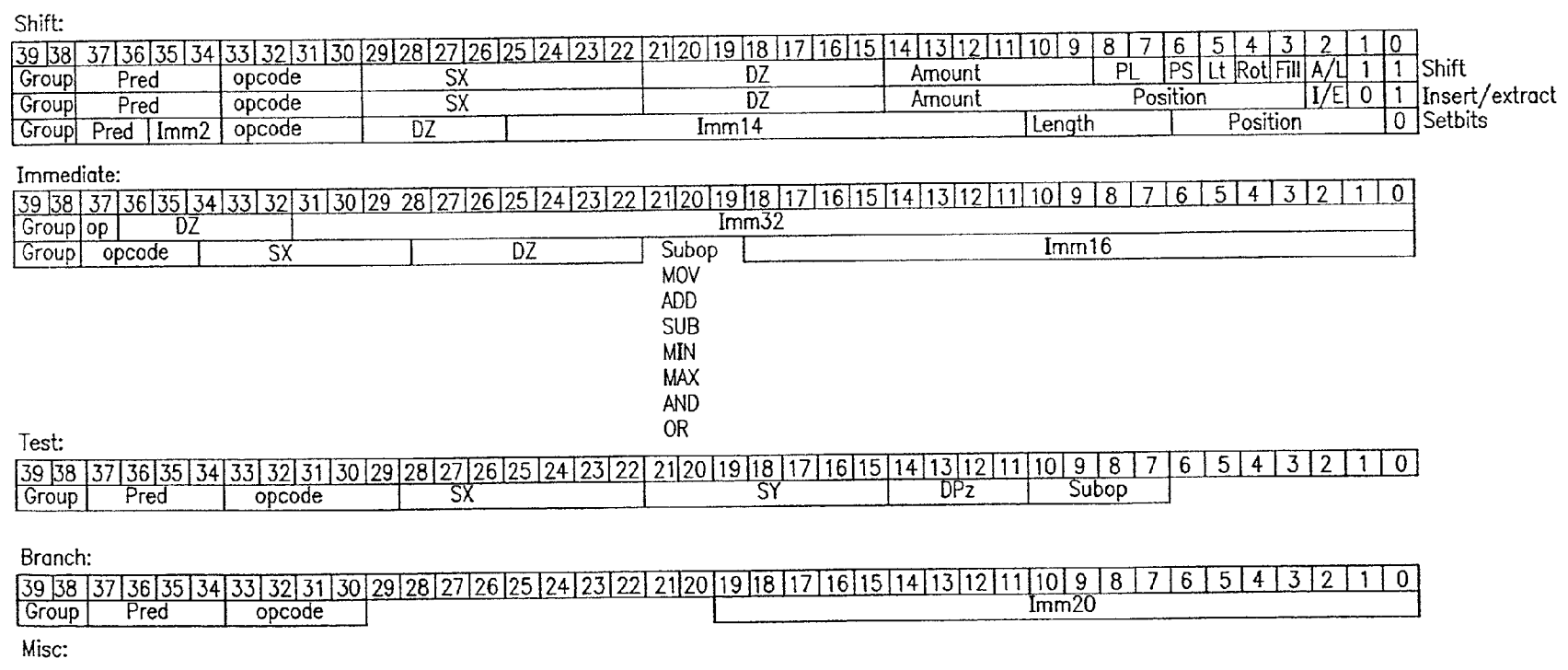

All DSP instructions of the instruction set architecture of the ASSP 150 are dyadic DSP instructions within the 20 bit or 40 bit instruction word. A dyadic DSP instruction informs the ASSP in one instruction and one cycle to perform two operations. Referring now to FIG. 6B is a chart illustrating the permutations of the dyadic DSP instructions. The dyadic DSP instruction 610 includes a main DSP operation 611 (MAIN OP) and a sub DSP operation 612 (SUB OP), a combination of two DSP instructions or operations in one dyadic instruction. Generally, the instruction set architecture of the present invention can be generalized to combining any pair of basic DSP operations to provide very powerful dyadic instruction combinations. Compound DSP operational instructions can provide uniform acceleration for a wide variety of DSP algorithms not just multiply-accumulate intensive filters. The DSP instructions or operations in the preferred embodiment include a multiply instruction (MULT), an addition instruction (ADD), a minimize/maximize instruction (MIN/MAX) also referred to as an extrema instruction, and a no operation instruction (NOP) each having an associated operation code ("opcode"). Any two DSP instructions can be combined together to form a dyadic DSP instruction. The NOP instruction is used for the MAIN OP or SUB OP when a single DSP operation is desired to be executed by the dyadic DSP instruction. There are variations of the general DSP instructions such as vector and scalar operations of multiplication or addition, positive or negative multiplication, and positive or negative addition (i.e. subtraction).

Referring now to FIG. 6C and FIG. 6D, bitmap syntax for an exemplary dyadic DSP instruction is illustrated. FIG. 6C illustrates bitmap syntax for a control extended dyadic DSP instruction while FIG. 6D illustrates bitmap syntax for a non-extended dyadic DSP instruction. In the non-extended bitmap syntax the instruction word is the twenty most significant bits of a forty bit word while the extended bitmap syntax has an instruction word of forty bits. The three most significant bits (MSBs), bits numbered 37 through 39, in each indicate the MAIN OP instruction type while the SUB OP is located near the middle or end of the instruction bits at bits numbered 20 through 22. In the preferred embodiment, the MAIN OP instruction codes are 000 for NOP, 101 for ADD, 110 for MIN/MAX, and 100 for MULT. The SUB OP code for the given DSP instruction varies according to what MAIN OP code is selected. In the case of MULT as the MAIN OP, the SUB OPs are 000 for NOP, 001 or 010 for ADD, 100 or 011 for a negative ADD or subtraction, 101 or 110 for MIN, and 111 for MAX. In the preferred embodiment, the MAIN OP and the SUB OP are not the same DSP instruction although alterations to the hardware functional blocks could accommodate it. The lower twenty bits of the control extended dyadic DSP instruction, the extended bits, control the signal processing unit to perform rounding, limiting, absolute value of inputs for SUB OP, or a global MIN/MAX operation with a register value.

The bitmap syntax of the dyadic DSP instruction can be converted into text syntax for program coding. Using the multiplication or MULT non-extended instruction as an example, its text syntax for multiplication or MULT is (vmul|vmuln).(vadd|vsub|vmax|sadd|ssub|smax) da, sx, sa, sy [,(ps0)|ps1)]

The "vmul|vmuln" field refers to either positive vector multiplication or negative vector multiplication being selected as the MAIN OP. The next field, "vadd|vsub|vmax|sadd|ssub|smax", refers to either vector add, vector subtract, vector maximum, scalar add, scalar subtraction, or scalar maximum being selected as the SUB OP. The next field, "da", refers to selecting one of the registers within the accumulator for storage of results. The field "sx" refers to selecting a register within the RISC register file 413 which points to a memory location in memory as one of the sources of operands. The field "sa" refers to selecting the contents of a register within the accumulator as one of the sources of operands. The field "sy" refers to selecting a register within the RISC register file 413 which points to a memory location in memory as another one of the sources of operands. The field of "[,(ps0) |ps1)]" refers to pair selection of keyword PS0 or PS1 specifying which are the source-destination pairs of a parallel-store control register. Referring now to FIGS. 6E and 6F, lists of the set of 20-bit DSP and control instructions for the ISA of the present invention is illustrated. FIG. 6G lists the set of extended control instructions for the ISA of the present invention. FIG. 6H lists the set of 40-bit DSP instructions for the ISA of the present invention. FIG. 6I lists the set of addressing instructions for the ISA of the present invention.

Referring now to FIG. 7, a block diagram illustrates the instruction decoding for configuring the blocks of the signal processing unit 300. The signal processor 300 includes the final decoders 704A through 704N, and multiplexers 720A through 720N. The multiplexers 720A through 720N are representative of the multiplexers 514, 516, 520, and 522 in FIG. 5B. The predecoding 702 is provided by the RISC control unit 302 and the pipe control 304. An instruction is provided to the predecoding 702 such as a dyadic DSP instruction 600. The predecoding 702 provides preliminary signals to the appropriate final decoders 704A through 704N on how the multiplexers 720A through 720N are to be selected for the given instruction. Referring back to FIG. 5B, in a dyadic DSP instruction the MAIN OP generally, if not a NOP, is performed by the blocks of the multiplier M1 504A, compressor 506, adder A1 510A, and adder A2 510B. The result is stored in one of the registers within the accumulator register AR 512. In the dyadic DSP instruction the SUB OP generally, if not a NOP, is performed by the blocks of the adder A3 510C and the multiplier M2 504B. For example, if the dyadic DSP instruction is to perform is an ADD and MULT, then the ADD operation of the MAIN OP is performed by the adder A1 510A and the SUB OP is performed by the multiplier M1 504A. The predecoding 720 and the final decoders 704A through 704N appropriately select the respective multiplexers 720A through 720B to select the MAIN OP to be performed by the adder A1 510A and the SUB OP to be performed by the multiplier M2 504B. In the exemplary case, multiplexer 520A selects inputs from the data typer and aligner 502 in order for adder A1 510A to perform the ADD operation, multiplexer 522 selects the output from adder 510A for accumulation in the accumulator 512, and multiplexer 514B selects outputs from the accumulator 512 as its inputs to perform the MULT SUB OP. The MAIN OP and SUB OP can be either executed sequentially (i.e. serial execution on parallel words) or in parallel (i.e. parallel execution on parallel words). If implemented sequentially, the result of the MAIN OP may be an operand of the SUB OP. The final decoders 704A through 704N have their own control logic to properly time the sequence of multiplexer selection for each element of the signal processor 300 to match the pipeline execution of how the MAIN OP and SUB OP are executed, including sequential or parallel execution. The RISC control unit 302 and the pipe control 304 in conjunction with the final decoders 704A through 704N pipelines instruction execution by pipelining the instruction itself and by providing pipelined control signals. This allows for the data path to be reconfigured by the software instructions each cycle.

As those of ordinary skill will recognize, the present invention has many advantages. One advantage of the present invention is that the ISA is adapted to DSP algorithmic structures providing compact hardware to consume low-power which can be scaled to higher computational requirements. Another advantage of the present invention is that the signal processing units have direct access to operands in memory to reduce processing overhead associated with load and store instructions.

Another advantage of the present invention is that pipelined instruction execution is provided so that instructions may be issued every cycle. Another advantage of the present invention is that the signal processing units can be configured cycle by cycle.

The preferred embodiments of the present invention are thus described. While the present invention has been described in particular embodiments, it may be implemented in hardware, software, firmware or a combination thereof and utilized in systems, subsystems, components or subcomponents thereof. When implemented in software, the elements of the present invention are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. In any case, the present invention should not be construed as limited by such embodiments, but rather construed according to the claims that follow below.

What is claimed is:

1. A method of performing dyadic digital signal processing (DSP) instructions, the method comprising:
   fetching a dyadic DSP instruction having a main operation and a sub operation;
   predecoding the dyadic DSP instruction to generate predecoded instruction signals; and
   decoding the predecoded instruction signals to generate select signals to selectively couple data from a first plurality of buses coupled to inputs of multiplexers of a first plurality of DSP functional blocks to execute the main operation of the dyadic DSP instruction in one processor cycle and to selectively couple data from a second plurality of buses coupled to inputs of multiplexers of a second plurality of DSP functional blocks to execute the sub operation of the dyadic DSP instruction in the one processor cycle.

2. The method of claim 1 of performing dyadic digital signal processing (DSP) instructions, wherein,
   the main operation and the sub operation are performed in parallel.

3. The method of claim 1 of performing dyadic digital signal processing (DSP) instructions, wherein,
   the main operation and the sub operation are performed sequentially.

4. The method of claim 1 of performing dyadic digital signal processing (DSP) instructions, wherein,
   the main operation and the sub operation are two different operations selected from the set of multiplication, addition, comparison with a minimum or maximum value, and no operation.

5. The method of claim 1 of performing dyadic digital signal processing (DSP) instructions, further comprising:
   prior to the fetching, writing the dyadic DSP instruction having the main operation and the sub operation into a memory, and
   wherein, the fetching of the dyadic DSP instruction is from the memory.

6. A method of performing dyadic digital signal processing (DSP) instructions, the method comprising:
   fetching a dyadic DSP instruction having a main operation and a sub operation;
   predecoding the dyadic DSP instruction to generate predecoded instruction signals;
   decoding the predecoded instruction signals to generate select signals to selectively switch between a plurality of buses coupled to inputs of multiplexers of a first plurality of DSP functional blocks for data to execute the main operation in one processor cycle and to selectively switch between a plurality of buses coupled to inputs of multiplexers of a second plurality of DSP functional blocks for data to execute the sub operation in the one processor cycle; and
   wherein the first plurality of DSP functional blocks includes a first adder and a first multiplier and the second plurality of DSP functional blocks includes a second adder and a second multiplier,
   the first adder and the first multiplier to perform addition, subtraction, multiplication, a comparison with a minimal value or a maximum value, or a combination thereof for the main operation of the dyadic DSP instruction, and
   the second adder and the second multiplier to perform addition, subtraction, multiplication, a comparison with a minimal value or a maximum value, or a combination thereof for the sub operation of the dyadic DSP instruction.

7. The method of claim 6 of performing dyadic digital signal processing (DSP) instructions, wherein,
   the main operation and the sub operation are performed in parallel.

8. The method of claim 6 of performing dyadic digital signal processing (DSP) instructions, wherein,
   the main operation and the sub operation are performed sequentially.

9. The method of claim 6 of performing dyadic digital signal processing (DSP) instructions, wherein, the main operation and the sub operation are two different operations selected from the set of multiplication, addition, comparison with a minimum or maximum value, and no operation.

10. A method of performing dyadic digital signal processing (DSP) instructions, the method comprising:
    fetching a dyadic DSP instruction having a main operation and a sub operation;
    predecoding the dyadic DSP instruction to generate predecoded instruction signals;
    obtaining at least three operands for execution of the main operation and the sub operation in one processor cycle; and
    decoding the predecoded instruction signals to generate select signals to select data from a plurality of buses coupled to inputs of multiplexers of a first plurality of DSP functional blocks to execute the main operation of the dyadic DSP instruction in the one processor cycle and to select data from a plurality of buses coupled to inputs of multiplexers of a second plurality of DSP functional blocks to execute the sub operation of the dyadic DSP instruction in the one processor cycle.

11. The method of claim 10 of performing dyadic digital signal processing (DSP) instructions, wherein,
    the at least three operands are obtained from a register or a memory location of a memory.

12. The method of claim 10 of performing dyadic digital signal processing (DSP) instructions, further comprising:
    executing the main operation and the sub operation in one processor cycle using the at least three operands.

13. The method of claim 12 of performing dyadic digital signal processing (DSP) instructions, further comprising:
    storing the results of the execution of the dyadic DSP instruction.

* * * * *